Jan. 26, 1943.   E. S. BIRD ET AL   2,309,496
HEATING APPARATUS FOR INJECTION MOLDING MACHINES
Filed March 2, 1939   3 Sheets-Sheet 1

Inventors:
Edward S. Bird
Leon F. Marsh
Graydon Smith
By Owen W. Kennedy
Attorney Jan. 26, 1943. E. S. BIRD ET AL 2,309,496
HEATING APPARATUS FOR INJECTION MOLDING MACHINES
Filed March 2, 1939 3 Sheets-Sheet 3

Inventors:
Edward S. Bird
Leon F. Marsh
Graydon Smith
By Owen W. Kennedy
Attorney Patented Jan. 26, 1943

2,309,496

UNITED STATES PATENT OFFICE 2,309,496

HEATING APPARATUS FOR INJECTION MOLDING MACHINES

Edward S. Bird, Worcester, Leon F. Marsh, Hudson, and Graydon Smith, Cambridge, Mass., assignors to Reed-Prentice Corporation, Worcester, Mass., a corporation of Massachusetts Application March 2, 1939, Serial No. 259,404

4 Claims. (Cl. 18—30)

The present invention relates to injection molding machines, particularly those employing material which is first rendered plastic by the application of heat, and is then injected into cooperating dies under pressure.

One object of the invention is to provide an improved heating apparatus of the above indicated character, wherein there is obtained a controlled heating of the thermoplastic material, such as to insure the uniform flow of the material through the apparatus, and its injection into the dies at a temperature best suited for the molding operation. Since thermoplastic material of the type utilized in the apparatus usually exhibits a relatively narrow temperature range, in which it has the desired flow characteristics, the invention contemplates the automatic maintenance of different degrees of heat at different stages in the conversion of the material from an unheated to a plastic condition, and in its flow through the apparatus to the dies. Such controlled heating substantially eliminates burning of the material either in the heater, or at the dies, and also makes it possible for the same heater to inject different quantities, or "shots," of plasticized material into different sized die cavities.

A further object of the invention is to provide a heating apparatus, wherein the passages through which the thermoplastic material moves, are so proportioned as to either gradually decrease, or remain constant, in cross sectional area, thereby making it possible to inject the plasticized material into the cooperating dies by the application of a moderately low pressure. Furthermore, these passages are formed with smooth continuous surfaces, with complete absence of pockets or angles in which the material may collect. Thus, there is assured an even measured movement of the entire mass of material in the heater for each operation of the injection plunger, so that when a change is made in the color or character of the thermoplastic material supplied to the machine, there will be no residual deposits of the previously used material, and the number of molded articles exhibiting a mixture of the two materials, will be reduced to a minimum.

The above and other advantageous features of the invention will hereinafter more fully appear from the following description, taken in connection with the accompanying drawings, in which.

Like reference characters refer to like parts in the different figures.

Figure 1:
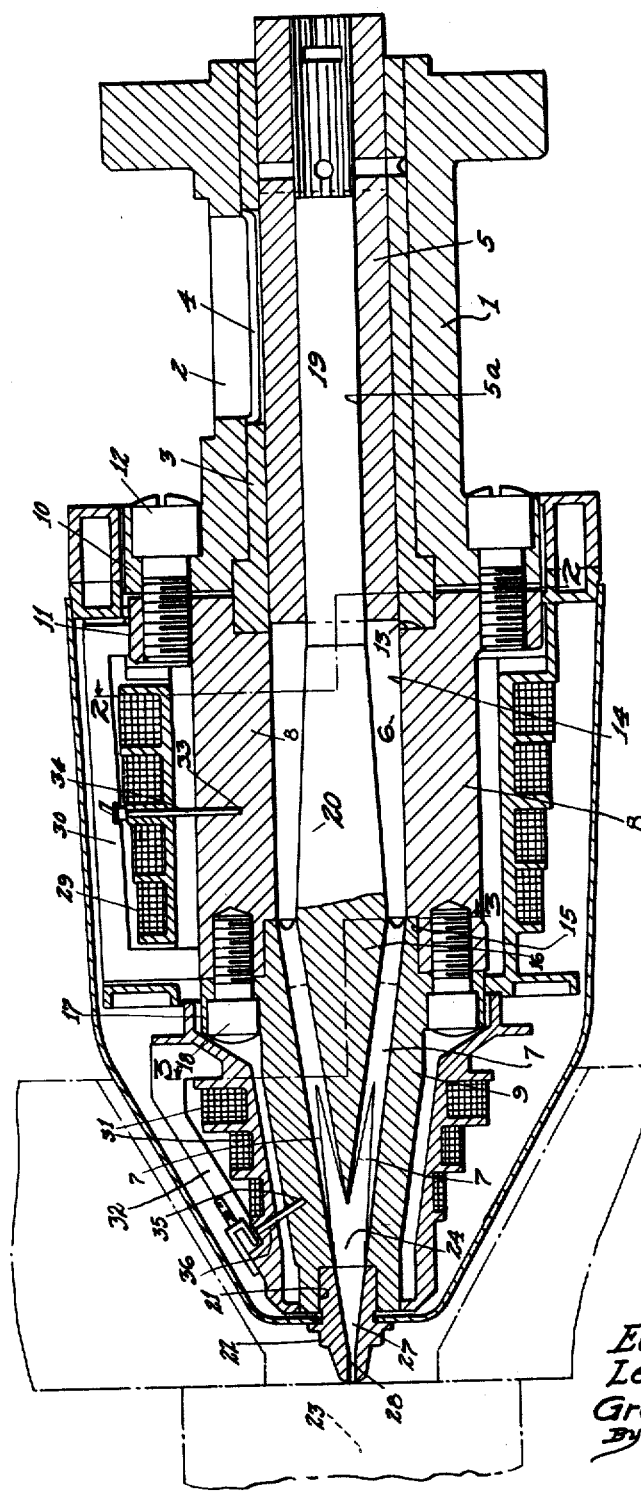
Fig. 1 is a longitudinal sectional view, showing the construction of heating apparatus embodying the invention.
Figure 2:
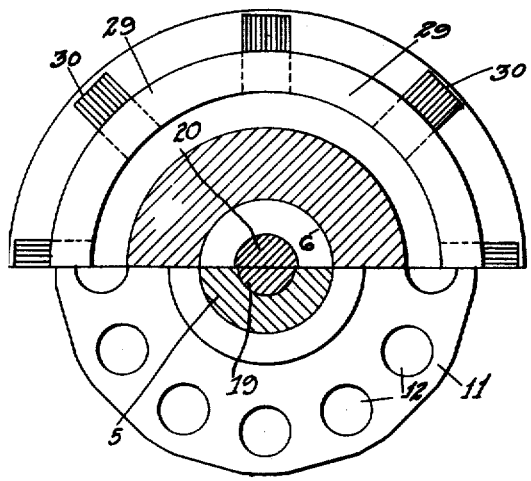
Fig. 2 is a transverse sectional view, along the line 2—2 of Fig. 1, looking in the direction of the arrows.

Referring first to Fig. 1, the heating apparatus is shown mounted on a feed cylinder 1, forming part of an injection molding machine, such, for example, as shown and described in the copending application of Frederick W. McIntyre, Serial No. 168,987, filed October 14, 1937, since issued as Patent No. 2,246,414, dated June 17, 1941. The wall of the cylinder 1 provides an opening 2, to which thermoplastic material, preferably in dry powdered form, is supplied by suitable mechanism adapted to deliver the material in charges of predetermined amount, as hereinafter more fully described with reference to Fig. 5.

The inside of the cylinder 1 is lined with a sleeve 3 of hardened metal, and provides an opening 4, in register with the opening 2 of cylinder 1. An injection plunger 5 fits closely within the sleeve 3, and is movable back and forth therein, by means shown in Fig. 5. When the plunger 5 is moved to the retracted position, indicated in dotted lines, wherein its end is back of the cylinder opening 2, a given charge of thermoplastic material may enter the cylinder 1, in front of the plunger 5. The plunger is annular in cross-section and by its forward movement in the cylinder 1, forces thermoplastic material previously admitted, first through an alined annular passage 6, and then through converging channels 7 provided in a heater assembly mounted on the cylinder 1.

For purposes of illustration, the heater assembly is shown as being formed in two parts 8 and 9, hereafter referred to as the heater body and nose, respectively, although obviously the passage 6 and channels 7 may be otherwise formed. In order to support the heater assembly, the forward end of the feed cylinder 1 provides a flange 10, to which is attached the heater body 8, by means of a flange 11 and bolts 12. The body 8 is generally in the form of a hollow cylinder, having a recess 13 to receive the projecting end of the plunger sleeve 3, with the bore 14 of the body 8 of exactly the same diameter as the outside diameter of the plunger 5.

The end of the body 8 opposite to the flange 11, provides an annular seat 15, in which fits a cylindrical end portion 16 of the heater nose 9. The nose 9 provides a flange 17, opposed to the end face of the body 8 and secured thereto by bolts 18. The nose 9 carries a core 19 extending rearwardly through the body 8, and making a close fit with the inside bore 5a of the plunger 5. The core 19 is of uniform diameter from its outer end to just beyond the end of the plunger sleeve 3, from which point it gradually increases in diameter, to provide a frusto-conical portion 20. Therefore, the annular passage 6 thus formed within the heater body 8, is of gradually decreasing cross-sectional area, between the forward end of the plunger 5 and the nose 9.

Beyond the flange 17, the nose 9 is tapered in form, and provides at its forward end, an opening 21, for receiving a suitable nozzle 22 for engagement with the dies of the associated injection molding machine, one of which is indicated in dotted lines at 23. Between the annular body passage 6 and the nozzle 22, the nose 9 provides the channels 7, the divergent ends of which are in alinement with the passage 6, while their converging center lines meet at a common point, to form a single passage 24. The cross-sectional area of the passage 24 is materially less than the total cross-sectional areas of the combined channels 7, so that at the entrance to the nozzle 21, the area available for the passage of the thermoplastic material is less than at any other point between the end of the injection plunger 5 and the entrance to the nozzle 21.

Figure 3:
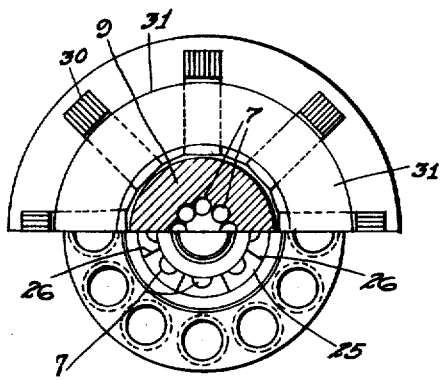
Fig. 3 is a transverse sectional view, along the line 3—3 of Fig. 1, looking in the direction of the arrows.

As best shown in Fig. 3, the divergent ends of the channels 7 are flared outwardly, as indicated at 25, where the channels open into the annular passage 6. Consequently, the flared ends of adjacent channels are separated by sharp edges 26, disposed at the smaller ends of the annular passage 6, and there is no appreciable resistance to flow of plasticized material from the passage 6 into the channels 7, as will later appear.

The nozzle 22 has a passage 27 therein, which at its inner end, corresponds in diameter to the passage 24 at the converging ends of the channels 7. The nozzle passage 27 gradually decreases in cross-section, to a neck 28, adjacent the discharge end of the nozzle. The restricted area of the passage 27 at the neck 28, is such that thermoplastic material injected into the die 23, will break away from the material further inside the nozzle, substantially at the neck 28 where the material has its smallest cross-section, and offers the least resistance to breaking loose.

The outside of the heater body 8 is surrounded by one or more coils 29, of decreasing diameter in the direction of the nozzle 22, which, when connected to a source of alternating current, cause magnetic heating of that portion of the body surrounding the passage 6, due to hysterisis effect within the body 8. To this end, the body 8 is composed of magnetic material of such a character as to produce a maximum hysterisis effect within the body, so that the heat is uniformly distributed throughout the body around the passage 6. In order to provide a return path for the magnetic flux outside of the coils 29, groups of laminations 30 are arranged at intervals outside the coils. The particular construction of the body 8, coils 29 and laminations 30, in order to obtain a magnetic heating effect within the body 8, forms no part of the present invention, but is more fully shown and described in the co-pending application of Graydon Smith and Albert Allen, Serial No. 258,494, filed February 25, 1939, since issued as Patent No. 2,226,447, dated December 24, 1940.

The nose 9 is similarly surrounded by one or more coils 31 of decreasing diameter, and groups of laminations 32, so arranged as to cause magnetic heating from hysterisis effect around channels 7, when the coils 31 are energized from an alternating current source. With the body 8 and nose 9 so related as to provide a continuous mass of magnetic material extending from the forward end of the injection plunger sleeve 3 to the nozzle 22, heating is continuous along the annular passage 6 and the converging channels 7. Since thermoplastic material of the type utilized in the present apparatus usually exhibits a relatively narrow temperature range, in which it has the desired flow characteristics, the invention contemplates the automatic control of the degree of heat at different portions of the heater, so as to insure conversion of the material from an unheated to a plastic condition, as well as the maintenance of the material in a properly plasticized condition for injection into the dies, always without danger of burning the material.

For the purpose of obtaining automatic control of temperatures within the heater, the body 8 provides an opening 33, within which is received a thermo-couple 34, the lower end of which is located substantially mid-way of the annular passage 6. The nose 9 similarly provides an opening 35, within which is received a thermo-couple 36, having its end located near the point where the channels 7 converge into the passage 24, adjacent to the nozzle 21. The thermo-couples 34 and 36 are of any well-known type, such as to generate a given voltage, when subjected to a given degree of heat.

Figure 4:
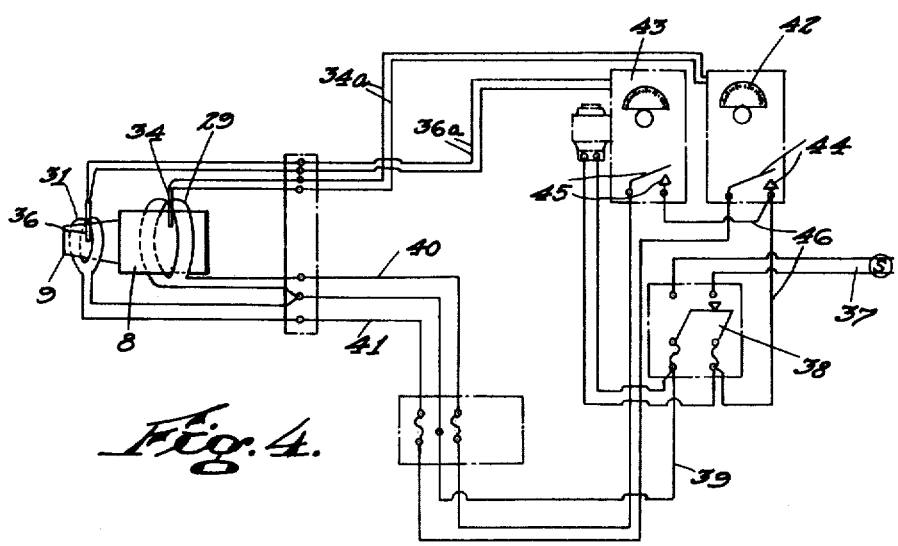
Fig. 4 is a diagrammatic view, illustrating the manner of obtaining controlled heating of the thermoplastic material as it passes through the apparatus.

Referring now to Fig. 4, there is shown a wiring diagram of the electrical connections for the coils 29 and 31, respectively, together with an arrangement for utilizing the corresponding thermo-couples 34 and 36 to automatically maintain different temperatures of predetermined degree, within the body 8 and the nose 9. In the control circuit, a source of alternating current is indicated at 37, one side of which is adapted to be connected to one terminal of each of the coils 29 and 31, through a switch 38 and a common conductor 39. The other terminals of the coils 29 and 31 are connected by conductors 40 and 41, to potentiometer controllers 42 and 43, providing pairs of relatively movable contacts 44 and 45, respectively, with a common conductor 46, leading from the potentiometer controllers to the other side of the source 37. The terminals of the thermo-couple 34 in the body 8, are connected by conductors 34a to the potentiometer 42 controlling the coils 29, while the terminals of the thermo-couple 36 in the nose 9, are connected by conductors 36a to the potentiometer 43 controlling the coils 31.

The potentiometers 42 and 43 are of any well-known type commercially available, and need not be described in detail herein, other than to state that each potentiometer 42 or 43 is adapted to automatically control, through the contacts 44 or 45, the connection or disconnection of the corresponding coil 29 or 31 to the source 37. Such automatic control is entirely dependent upon the normal functioning of the potentiometer 42 or 43, in response to the voltage generated by the thermo-couple 34 or 36, when the temperature within the body 8 or nose 9 reaches a predetermined degree. With the control arrangement shown diagrammatically in Fig. 4, it is possible to so set the potentiometers 42 and 43, that a given temperature will be maintained within the body 8, around the passage 6, while a lower or even higher temperature will be maintained within the nose 9, around the channels 7. Obviously, there will be gradations of this temperature range between the nozzle 21 and the plunger end of the passage 6, the net result being that there is a constantly maintained gradual reduction or increase in the temperature of the heater portions surrounding the thermoplastic material, as a predetermined charge thereof moves through the heater and is converted from a cold to a plasticized condition.

Figure 5:
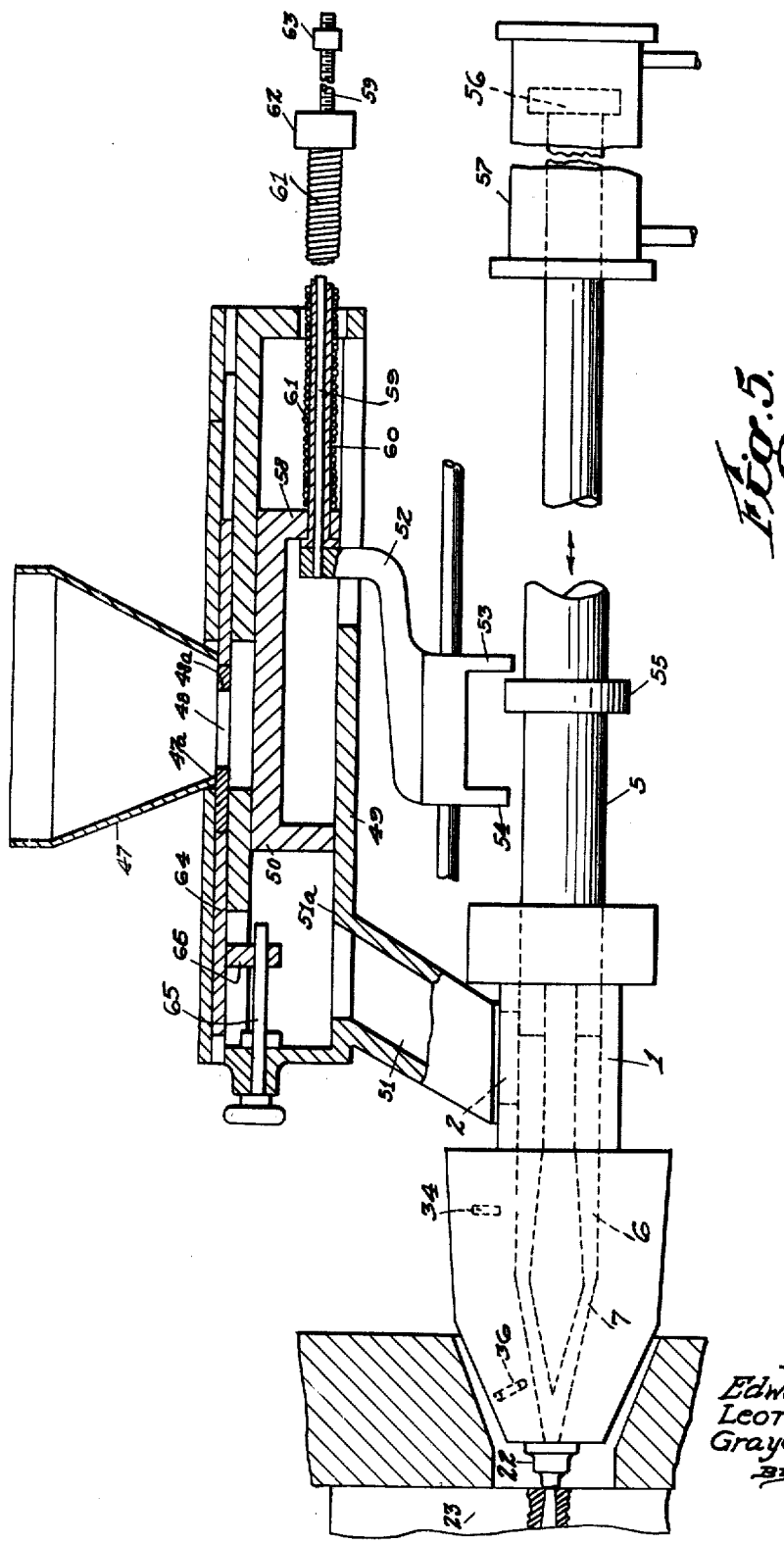
Fig. 5 is a view partially in section and partially in side elevation, illustrating mechanism for feeding fresh thermoplastic material to the heater in charges of predetermined amount.

As previously pointed out, the amount of material in each charge delivered to the cylinder 1 is controlled by the mechanism shown in Fig. 5, wherein a hopper 47 provides an opening 48 communicating with a charging cylinder 49. A piston 50 is movable within the cylinder 49, so as to admit material from the hopper into the cylinder 49 through the opening 48, when the piston is moved to its extreme right-hand position. The left-hand end of the cylinder 49 opens into a chute 51, extending downwardly into communication with the opening 2 leading to the feed cylinder 1, and left-hand movement of the piston 50 is adapted to cause discharge of material into the chute 51.

Reciprocatory movement is imparted to the piston 50 from the injection plunger 5 through a yoke 52, slidably mounted above the plunger 5. The yoke 52 provides spaced operating projections 53 and 54, between which moves a collar 55 mounted on the plunger 5, so that as the plunger 5 is moved back and forth by a piston 56 operating in a fluid pressure cylinder 57, the collar 55 imparts movement to the yoke 52 only when the plunger 5 nears the end of its operating stroke in either direction of movement. The yoke 52 extends upwardly inside the piston 50, and is adapted to engage a head 58 at the right-hand end of the piston 50, whereby movement of the yoke 52 to the right is directly imparted to the piston 50.

For the purpose of imparting left-hand movement of the yoke 52 to the piston 50, the yoke provides a rod 59 extending through a sleeve 60, loosely carried by the piston head 58. The sleeve 60 is surrounded by a spring 61 between the head 58 and a collar 62, so that normally, the sleeve is maintained in the extended position shown. The rod 59 extends freely through the sleeve 60, and is threaded to receive an adjustable stop 63, the position of which on the rod 59 determines the amount of material in each charge delivered to the cylinder 1, for feeding to the heater on each injection stroke of the plunger 5.

When the plunger 5 moves to the right, engagement of the plunger collar 55 with the right-hand yoke projection 53, moves the yoke 52 to the right as the plunger nears the end of its return stroke. The yoke 52 thus imparts movement directly to the piston head 58, so that the piston 50 is moved to its extreme right-hand position to expose the opening 48 and admit thermoplastic material into the cylinder 49 in front of the piston. When the plunger 5 starts its movement to the left, this movement is not imparted to the yoke 52 until the collar 55 strikes the yoke projection 54, as the plunger reaches that point in its injection stroke wherein it shuts off the cylinder opening 2. However, this movement of the yoke 52 is not imparted to the feeding piston 50 until the stop 63 on the rod 59 engages the collar 62 on the sleeve 60. When such engagement occurs, movement is imparted to the piston 50 through the spring 61, and the degree of this movement will exactly determine the size of the charge of material that is fed into the heater for each injection stroke of the plunger 5.

By adjusting the position of the stop 63 on the rod 59, with respect to the sleeve collar 62, the left-hand limit of the movement of the piston 50 in the cylinder 49, can be closely set to determine just how much of the material in the cylinder 49 will be delivered to the heater. Thus, shifting of the stop 63 to the right on the rod 59, will shorten the left-hand travel of the piston 50 in the cylinder 49 to any desired extent, and so limit the amount of material that is pushed over the edge of the chute 51 on the charging stroke of the piston 50. In this way, each charge can be made to substantially correspond to the size of each "shot" of plasticized material forced into the dies on the injection stroke of the plunger 5, since any decrease in the length of the injection stroke of the plunger 5, due to filling of the dies, will correspondingly shorten the charging stroke of the piston 50.

While it is contemplated that the cross-sectional area of the hopper opening 48 shall remain unchanged for a given range of injection shots, the area of the opening can be varied, if desired, by shifting a plate 64 having the opening 48 therein, so as to alter the distance between one edge 48a of the opening and a bottom edge 47a of the hopper 47. To this end, the plate 64 is movable beneath the hopper, by means of a screw shaft 65, mounted at the end of the cylinder 49 beyond the chute 51. The threads on the shaft 65 cooperate with a nut 66 carried by the plate 64, so that by turning the shaft, the plate 64 can be moved longitudinally. Should it be desired to shut down the machine quickly, the shaft 65 can be readily turned to shift the plate 64 far enough to close the opening 48 entirely, and thereby prevent any further discharge of material to the cylinder 1.

After the plunger 5 has made several strokes, a sufficient quantity of the material from the hopper 47 will have been delivered to the heater to have completely filled the passage 6, channels 7 and the alined nozzle passages 24 and 27. This condition having once been obtained, subsequent operations of the plunger 5 will cause the injection of predetermined shots of plasticized material into the dies, and the automatic control of the temperatures within the parts of the heater, is such as to assure a uniformity of molded product. Such uniformity results primarily from the functioning of the potentiometer controllers 42 and 43, whereby the temperatures are definitely maintained at such a degree as to insure that each given charge of fresh material fed into the heater, undergoes the same stages of heating, in being first transformed from a dry to a semi-plasticized condition in the passage 6, and being thereafter divided in the channels 7 wherein the material is converted into a plasticized condition, best suited for its injection into the dies.

When a charge of thermoplastic material first enters the passage 6 in the heater body 8 at the completion of the injection stroke of the plunger 5, it remains stationary while the plunger withdraws to admit a fresh charge to the cylinder 1. In the interval that elapses before the plunger moves again, the relatively loose granular material in the passage 6 becomes only partially plasticized, due to the fact that a considerable transfer of heat must take place between the heated walls of the passage 6 and the material. However, when this heated annular mass of semi-plastic material is forced into the channels 7, by further movement of the plunger 5, the material is divided into a relatively large number of thin streams, each entirely surrounded by the heated metal of the nose 9, with the result that the material in each channel 7 quickly reaches a condition of plasticity, ready for injection into the dies.

Therefore, each charge of material passes through two independently controlled stages of heating; first, a stage in which partial plasticization is accomplished while the material is an annular mass, and second, a stage in which a condition of complete plasticity is obtained, while the material is divided into a number of thin streams, each of relatively small cross-section, as compared to the entire cross-section of the annular mass in the first stage.

While the particular temperatures to be maintained for each stage necessarily vary for different types of thermoplastic material, generally speaking, best results are obtained when the nose 9 containing the channels 7 is maintained at a temperature materially lower than the temperature within the body 8 surrounding the annular passage 6. Such temperature differences are primarily due to the fact that the amount of heat necessary to transform a single mass of given material from a cold to a partially plasticized condition, is greater than the amount of heat required to obtain the desired degree of plasticity in already heated material that has been subdivided into thin streams. However, it has been found that some thermoplastic materials are of such a nature as to require the maintenance of a temperature around the channels 7 that is substantially equal to, or even greater than, the temperature maintained in the body 8 around the passage 6.

By properly setting the controllers 42 and 43, it is possible to automatically maintain any given material within the particular temperature range at which it is most readily plasticized and exhibits the desired flow characteristics, without burning. Therefore, each injection stroke of the plunger 5 will result in a given amount of the plasticized material being forced into the cooperating dies 22, while at the same time a substantially equal amount of fresh material is fed. As the material is advanced through the apparatus by the plunger 5, it is to be particularly noted that the annular passage 6 gradually decreases in cross-section, while the combined cross-sectional areas of the channels 7 are less than the smallest cross-section of the passage 6, with the areas of nozzle passages 24 and 27 even smaller. Since the plasticized material thus always travels in the direction of passages of decreasing cross-sectional areas, it follows that, for a given rate of movement of the plunger 5, the plasticized material will move at a constant or gradually increasing rate, which is highest where it enters the dies.

It is also to be noted that in its entire passage through the apparatus, the plasticized material encounters only smooth, substantially continuous surfaces, with an entire absence of pockets or sharp angles where the material may collect and offer resistance to the flow of the entire mass. This is particularly true where the material enters the channels 7 from the passage 6, it being evident that the flared portions 25 between the edges 26, will greatly facilitate free entry of the material into the channels. Furthermore, the convergence of the channels 23 into a common passage 24, insures merging of the several streams of material into a single stream, with a mixing action, before it enters the nozzle.

In operation of the heater, it has been found when using a given thermoplastic material, a very definite relation exists between the amount of material fed in each charge and injected into the dies at each shot, and the temperatures to be automatically maintained at the different heating stages of the apparatus to insure proper flow of the plasticized material. For example, the use of a two ounce shot of material may require the maintenance of body and nose temperatures of approximately 400° and 360°, respectively, while a six ounce shot of the same material may require the maintenance of increased body and nose temperatures of approximately 470° and 420°, respectively, in order to handle the larger charges. The particular figures given above are purely illustrative of the conditions that must be maintained for a given material, and obviously, the apparatus of the present invention is just as effective in operation when utilizing thermoplastic material requiring entirely different temperature ranges.

From the foregoing, it is apparent that by the present invention there is provided an improved heating apparatus for injection molding machines employing thermoplastic material, wherein there is obtained a controlled heating, such as to insure a uniform flow of the material through the apparatus, and its injection into the dies, with a degree of plasticity best suited for the molding operation. The automatic maintenance of temperatures, within the particular range adapted for the thermal characteristics of a given material, insures the elimination of burning of the material, either in the heater or at the dies. Furthermore, the adjustability of the temperatures that are automatically maintained within the heater, makes it possible for the same heater to properly handle different sized charges of material fed to the heater, to substantially correspond with different sized shots injected into the dies for each operation of the plunger.

A further advantageous feature of the heater from an operating standpoint, resides in the fact that the material, in its conversion from a dry to a plasticized condition, travels in passages of decreasing cross-section, in the direction of movement of the material, so that for a given rate of injection plunger movement, the material will move at a gradually increasing rate, which will be greatest where the plasticized material leaves the heater and enters the dies. Furthermore, these passages are formed with smooth continuous surfaces, without pockets or angles in which accumulated material might burn or become discolored, due to its failure to move along with the main mass of material. Thus, there is assured an even, measured movement of the entire mass of material in the heater for each operation of the injection plunger. Therefore, when a change is made in the color or character of the thermoplastic material supplied to the machine, there will be no residual deposits of the previously used material, and the number of molded articles exhibiting a mixture of two materials, will be reduced to a minimum. In fact, it has been found that when changing over from one color of material to another, only one or two shots will be required to entirely clear the heater passages of the old material.

While for purposes of illustration the passages for the thermoplastic material have been shown and described as being heated by a hysterisis effect within the surrounding metal, obviously, other means may be employed for applying controlled heat around the passages, without departing from the invention, as set forth in the following claims.

We claim:

1. Heating apparatus for injection molding machines, comprising in combination, a member having a continuous passage therethrough for the movement of heat plasticizable material as a single mass, a plurality of separate channels communicating with said passage for dividing the material into a number of thin streams as it passes therethrough, separate heating means surrounding said passage and channels, and independently operating control devices associated with said heating means for automatically maintaining different temperatures in the vicinity of said passage and channels.

2. Heating apparatus for injection molding macines, comprising in combination, a member providing channels for the movement of heat plasticizable material therethrough, first as a single mass, and then sub-divided into thin streams, separate heating means disposed at different portions of said member, and control devices for said heating means for automatically maintaining one portion of the member at a temperature sufficient to transform a single mass of material from a cold to a partially plasticized condition, while maintaining another portion of said member at a reduced temperature sufficient to maintain the desired degree of plasticity in the already heated material, after it has been divided into thin streams.

3. Heating apparatus for injection molding machines, comprising in combination, a member of heat conducting material having a continuous passage of varying cross-section extending therethrough for the movement of heat plasticizable material, coils surrounding different portions of said member, a source of electrical current, means for independently energizing said coils from said source, to obtain heating within said member in the vicinity of said passage, and means responsive to temperatures within said member at separated points along said passage for automatically controlling the connection and disconnection of said coils to and from said source and thereby maintain a predetermined temperature gradient along said passage.

4. Heating apparatus for injection molding machines, comprising in combination, a member of heat conducting material having a continuous passage of decreasing cross-section extending therethrough for the movement of heat plasticizable material, coils surrounding different portions of said member, a source of electrical current, means for independently energizing said coils from said source, to obtain a heating effect within said member in the vicinity of said passage, thermo-couples located in said member at separated points along said passage and controllers responsive to the functioning of said thermo-couples for automatically connecting and disconnecting said coils to and from said source and thereby maintain different portions of said member along said passage at different predetermined temperatures decreasing in the direction of material flow.

EDWARD S. BIRD.
LEON F. MARSH.
GRAYDON SMITH.